UNITED STATES PATENT OFFICE.

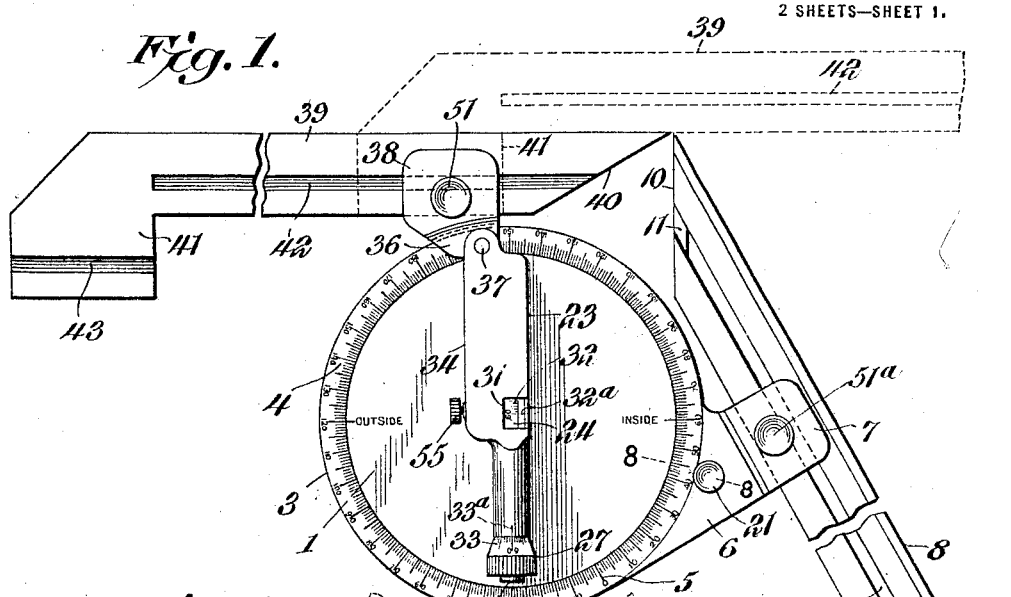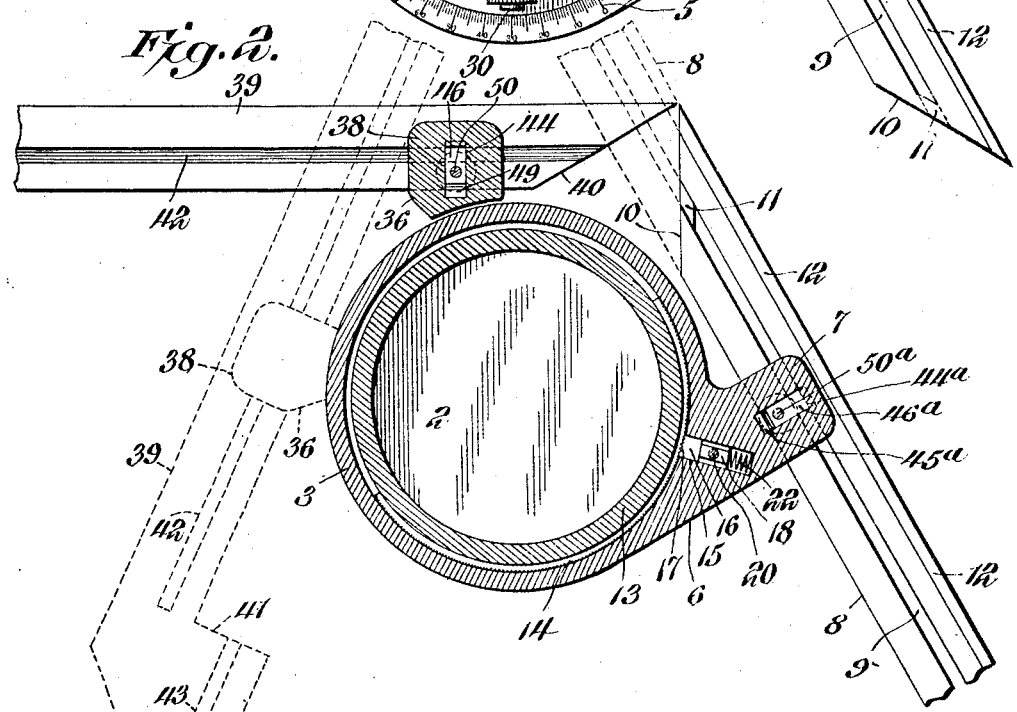

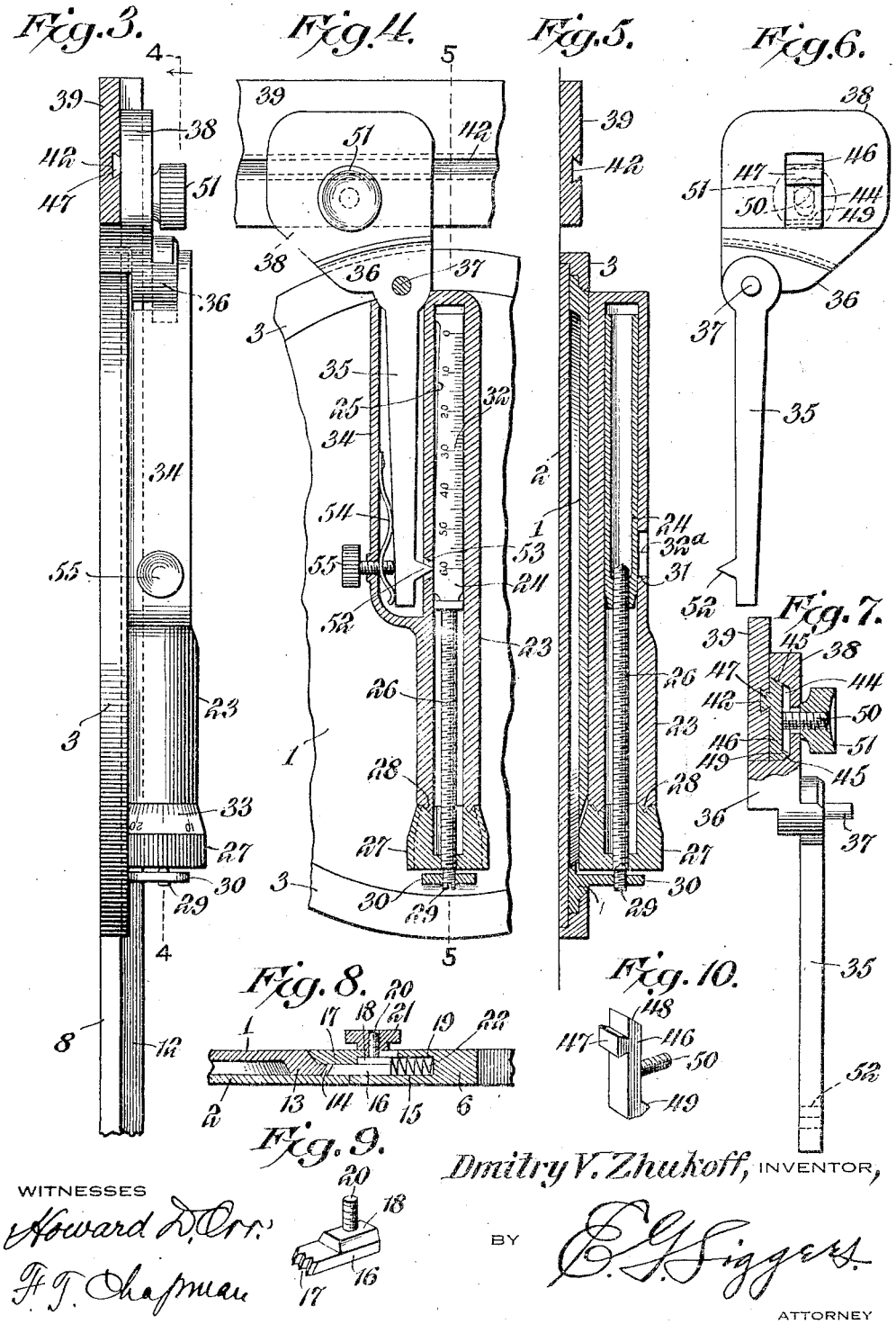

DMITRY V. ZHUKOFF, OF RICHMOND, VIRGINIA.

BEVEL-PROTRACTOR.

1,358,604.　　　　Specification of Letters Patent.　　Patented Nov. 9, 1920.

Application filed October 14, 1918. Serial No. 258,004.

*To all whom it may concern:*

Be it known that I, DMITRY V. ZHUKOFF, a citizen of Russia, residing at Richmond, in the county of Henrico and State of Virginia, have invented a new and useful Bevel-Protractor, of which the following is a specification.

This invention has reference to bevel protractors designed for all classes of work where angles are to be laid out or measured, and is particularly intended for determining extremely small angles with accuracy to minute fractional portions of a degree.

In accordance with the invention either inside or outside angles may be measured or determined easily and quickly to a second of a degree. The protractor comprises two relatively rotatable members having a common axis, one member including oppositely arranged scales with graduations up to 180° each. The two relatively rotatable members of the protractor each have a work-engaging blade adjustable lengthwise with that blade mounted on the graduated member that it may be moved on an axis eccentric to the common axis of the two members to extents representing small fractional parts of a degree, thus permitting the angular relations of the blades to be established with extreme accuracy.

The invention will be best understood from a consideration of the following detailed description taken in connection with the accompanying drawings forming part of this specification, with the understanding, however, that the invention is not confined to any strict conformity with the showing of the drawings but may be changed and modified so long as such changes and modifications mark no material departure from the salient features of the invention as expressed in the appended claims.

In the drawings:—

Figure 1 is a plan view of a protractor embodying the invention.

Fig. 2 is a view similar to Fig. 1 but with the body portion of the protractor in section on a plane transverse of the common axis of the two relatively rotatable portions of the protractor.

Fig. 3 is an edge view, with some parts in section, of the protractor shown in Fig. 1 but on a larger scale.

Fig. 4 is a section on the line 4—4 of Fig. 3.

Fig. 5 is a section on the line 5—5 of Fig. 4.

Fig. 6 is an elevation of a lever showing the reverse face from that shown in Fig. 4.

Fig. 7 is an edge view of the lever of Fig. 6 as seen from the left hand side of Fig. 4.

Fig. 8 is a section on the line 8—8 of Fig. 1, but shown on a larger scale.

Fig. 9 is a perspective view of a latch member shown in Fig. 8.

Fig. 10 is a perspective view of a clamp member shown in Fig. 7.

Referring to the drawings, there is shown a plate 1 held between a backing plate 2 and a ring 3, see Fig. 5, which backing plate and ring are fastened together to retain the plate 1 but permit relative rotary movement of the plate 1 and ring 3.

Produced on the visible face of the ring 3 are scales or graduations 4 which, in the showing of the drawings and for the purposes of the invention, include 360° divided into two groups of 180° each reading oppositely from a zero mark indicated at 5. Extending tangentially from the zero point of the ring is an arm 6 terminating in a clamp 7 for carrying and guiding a blade or straight edge 8. In order to effect such guiding the blade 8 is provided with a longitudinal slot 9 terminating at the ends of the blade, which ends are beveled as indicated at 10, and across the ends of the slot 9 are bridge pieces 11, the bridge piece at one end being located at one face of the blade and the bridge piece at the other end being located at the opposite face of the blade. The long side, which constitutes the outer edge of the blade, is provided with an angle flange or ledge 12 permitting the blade for some uses to be placed against an angle edge in ascertaining some angular measurements.

The plate 1 has a stepped periphery 13 best shown in Fig. 8, and also appearing in Fig. 5. This periphery at its outer edge is somewhat undercut or beveled and formed with teeth 14 which latter each extend circumferentially of the plate for a distance equal to one degree.

In order to hold the plate 1 and ring 3 together for final movement, the arm 6 is cut away to provide a recess 15 radial to the axis of rotation of the ring 3 and of a radial length to house a dog 16, shown separately in Fig. 9 and also appearing in Figs. 2 and 8. This dog has teeth 17 at one end matching the teeth 14 in the periphery of the plate or disk 1. The dog 16 is provided on one face with a block or enlargement 18 constituting a bevel tongue movable in a beveled channel 19 forming part of the recess 15. Fast to the block 18 is a screw stem 20 to which is applied a thumb nut 21 and the recess 15 also houses a spring 22 constantly urging the dog 16 toward the teeth 14. In order to insure the position in which the disk or plate 1 may be locked by the dog 16 the thumb nut may be tightened. If such fastening of the block is not necessary or desirable the nut 21 may be replaced by a suitable knob.

Mounted on the plate or disk 1 is a tubular casing 23 extending across the plate in a generally diametric direction. Within and capable of moving lengthwise of the tube 23 is an elongated hollow wedge block or bar 24 of generally rectangular cross section but with one side tapering lengthwise, as shown at 25, Fig. 4. At the larger end of the wedge block 24 it is internally threaded for the reception of a screw rod 26 projecting through and fast to a manipulating head 27 at one end outside of the tube or casing 23. An annular tongue 28 at the end of the tube 23 where the head 27 is mounted enters a corresponding groove in the head, and a pointed screw 29 is seated in the end of the head and is carried by a support 30 projecting from the plate 1, the arrangement being such that the head 27 with the screw 26 may be rotated at the will of the operator but neither the head nor the screw will have any longitudinal movement. The tube or casing 23 is provided at a convenient point with a window or view passage 31 and along one side of the wedge block 24 are graduations 32 visible through the window 31. These graduations are from zero to 60. The head 27 is peripherally graduated as indicated at 33 into sixty equal divisions.

The tube or casing 23 has a side extension 34 into which extends, in a direction lengthwise of the tube, an arm 35 of a lever 36 capable of rocking on a pivotal axis 37 mounted on the side extension 34 closely adjacent to the graduations 4 of the ring 3. The lever 36 is of the first class and is provided with an arm 38 on the side of the pivot remote from the arm 35, which arm is expanded laterally to bear against one face of a blade or straight edge 39, similar to, but differing in some details from the blade 8. The blade 39 has one end 40 beveled similarly to the beveled ends 10 of the blade 8 and the other end formed into a lateral expansion 41. Extending lengthwise of the blade 39 between the sides thereof is a dovetail groove 42 and the expansion 41 of the blade 39 has a longitudinal dovetail groove 43 in spaced relation to and parallel with the groove 42. The arm 38 on the face toward the blade 39 is provided with a recess 44, Fig. 7, tapering from the sides toward the bottom to provide tapering shoulders 45. Adapted to the recess 44 is a block 46 shown separately in Fig. 10. This block has a dovetail tongue 47 on one face to fit in either of the dovetail grooves 42 or 43, the tongue being near one end of the block, which latter is elongated, while the end of the block adjacent to the tongue 47 is beveled, as shown at 48, to engage one of the bevel shoulders 45 of the recess 44. On the opposite face of the block 46 from the tongue 47 and at the end remote from the beveled end 48 is a bevel tongue 49 corresponding to the bevel 45 at the corresponding end of the recess 44. At an intermediate point of the face of the block 46 provided with the tongue 49 is a screw stem 50 projecting through the arm 38 of the lever 36 and provided with a thumb nut 51.

The structure is such that the tongue 47 will engage in either dovetail groove 42 or 43, and the thumb nut 51 engaging the stem 50 will draw the block 46 into the recess 44 thereby clamping it by way of the beveled portions 45, 48 and 49 and firmly seating the tongue 47 in the groove in which it is engaged, the whole structure firmly holding the blade 39 to the lever 36 in any position lengthwise of the lever to which it may have been moved.

A similar clamping arrangement is provided for holding the blade 8 to the arm 6 and like reference numerals are provided for the similar parts, except that with respect to the blade 8 and arm 6, the numerals are provided with the exponent $a$.

The lever arm 35 at the end remote from the arm 38 is provided with a lateral knife edge projection 52 extending through a passage 53 in the tube 23 and bearing against the taper wall 25 of the wedge block 24. The spring 54 within the casing extension 34 serves to constantly urge the knife edge 52 of the arm 35 against the wedge block 24. A set screw 55 threaded through the casing extension 34 and engaging the arm 35 serves to hold it in constant engagement with the taper edge 25 of the wedge block 24.

The protractor is designed primarily for the measurement of angles to micrometric accuracy but it is to be understood that features of the invention may be used where such accuracy is not necessary. Provision is made for the quick or coarse adjustment of the two blades 8 and 39 into an approximation of the desired angular relation. Because of the freedom of longitudinal movements of the blades and the capability of clamping the blade 39 at different distances from the axis of rotation, due to the expansion 41 of the blade, and also of clamping both blades in different positions of longitudinal adjustment, either inside or outside angles may be set or measured. Because of the dog 16 the blades are locked when coarsely set, in the desired position, with the established positions accurate within a degree of angular position. With such relative positions of the blades and in which the locking is automatic, finer or micrometric adjustments are obtainable by the head 33, causing the blade 39 to rock to minute extents about the axis of the pivot support 37 with a maximum range of one degree in coarser subdivisions of one minute and in finer subdivisions of one second.

The depth of the inclined edge 25 of the wedge bar 24 is equal to the distance between two adjacent teeth 14, or equal in extent to the rotative movement of the index or dial 4 through one degree, which movement is readily accomplished by hand with the dial automatically locking at the completion of such movement by the engagement of the dog 16 with the toothed periphery of the plate or disk 1. The wedge block 24 is made of considerable length so that the pitch or inclination of the edge 25 to the length of the wedge block may be very slight, permitting the threads on the rod 26 to be made sturdy so as to resist wear and ordinary handling. Moreover, this permits the spacing of the indications on the scale 32 to be far enough apart to be readily visible through the window or sight opening 31, a fixed mark 32ª adjacent to the wedge bar 24 and observable through the window 31 facilitating the reading of the scale 32. The pitch of the threads on the rod or screw 26 corresponds to the divisions of the scale 32, wherefore, each complete turn of the head 27 will move the wedge bar 24 an extent equal to one division of the scale 32. There are sixty such divisions and the extent of inclination of the edge 25 being equal to the spacing of one degree on the scale 4, sixty turns of the head 27 causes a rocking of the lever arm 35 through one degree of angular movement and a similar movement of the blade 39. A single complete turn of the head 27 causes a rocking of the arm 39 through one minute of angular movement. However, the head 27 is marked off into sixty divisions, any one of which may be brought into coincidence with a determining mark 33ª on the casing or tube 23 adjacent to the index 33 on the head 27. Consequently a rotatable movement of the head 27 through one division of the index or one-sixtieth of a revolution causes a lengthwise movement of the bar 24 through one-sixtieth of the divisions marked thereon, this representing one second of angular adjustment of the blade 39. It is evident, of course, that the various instrumentalities must be properly proportioned to cause the movements named and, furthermore, precautions must be taken to avoid any lost motion and hence accurate fitting is essential.

The term blade, as applied to the work-engaging devices 8 or 39, is designed to have a meaning broad enough to include any work-engaging device or structure which may be used in connection with the protractor, whether such blade be an integral part of the structure carrying it or be a separate part as shown in the drawings.

The micrometer device herein disclosed is similar in general construction to that disclosed in my companion application, Serial No. 258,005, for calipers, filed Oct. 14, 1918, except that in the companion application the micrometer device is mounted to actuate a movable element capable of sliding to propel the movable jaw of the calipers, instead of engaging a movable element capable of swinging to actuate an angle measuring blade, as in this application. I wish, however, that claims in this application be construed to cover the use of the micrometer device, not only in a protractor, but in calipers or in any other precision instrument to which it may be adapted.

What is claimed is:

1. A protractor comprising two associated relatively rotatable members having an axis concentric thereto, and a blade for and located beyond the margins of each member, said blades being provided with straight edges and related to jointly measure angles and one blade having micrometric means on one of the members for rocking said blade with respect to said member carrying it about an axis eccentric to the common axis of the two members.

2. A protractor comprising two associated relatively rotatable circular members having a common axis concentric thereto, and a blade for and located beyond the margins of each member, one blade having a mounting on and connecting it to the member carrying it and, together with the blade, being movable, with respect to the member carrying it, about an axis adjacent to the margin of the member and eccentric to the common axis of said members.

3. A protractor comprising two concentrically relatively rotatable members, coactive means on said members for restricting the relative movements about the common axis to predetermined minimum steps, a blade on each member having means adapting it to be moved with respect thereto lengthwise of the respective blade, and micrometer means for moving one of the blades about an axis eccentric to the member carrying it and to fractional parts of the predetermined step movement of said member.

4. A protractor comprising two associated relatively rotatable members having a common axis, and a blade on each member movable with respect to the member lengthwise of the respective blade, and one of the blades being rockably supported on the member carrying it for movement about an axis eccentric to the common axis of the two members.

5. A protractor comprising two concentric relatively rotatable members, one having a scale thereon representing units of measurement and the other being provided with teeth spaced in accordance with the units of measurement, and a yieldable dog on the first-named member having a normal tendency to move toward and engage the teeth of the second-named member.

6. A protractor comprising two concentric relatively rotatable members, one having a scale thereon representing units of measurement and the other being provided with teeth spaced in accordance with the units of measurement, and a yieldable dog on the first-named member having a normal tendency to move toward and engage the teeth of the second-named member, the teeth of the second-named member and the dog on the second-named member for engaging them being both housed in the second-named member and said dog having accessible means for manipulating it in opposition to its normal tendency.

7. A protractor comprising two associated relatively rotatable members having a common axis with one of the members having a scale representing units of measurement and said members having coacting means for holding them in different positions of adjustment about the common axis, and blades on the two members adjustable with respect to the members in the direction of the length of the blades, one blade having an offset at one end for attachment to the respective member at a greater distance from the axis of rotation than the attachment of the other blade to the other member, whereby the two blades may be used for either inside or outside measurements.

8. In a protractor, associated relatively rotatable members having a common axis, and a blade for each member movable therewith, each blade being provided with a longitudinal groove for permitting longitudinal adjustment of the respective blade, and clamping means for holding the blade in adjusted positions on the member carrying it, comprising a block with a tongue engaging the groove, said block having opposite ends beveled with the member carrying the blade provided with a beveled recess for receiving the block and its bevel ends, and a holding screw and nut for fastening the block in the recess against the bevel portions thereof.

9. A protractor comprising associated rotatable members having a common axis, a blade for each member having a longitudinal dovetail groove therein, a block for each blade having near one end a dovetail tongue projecting from one face of the block and near the other end a bevel tongue projecting from the opposite face of the block and the end of the block adjacent to the dovetail tongue being beveled in the same direction as the bevel tongue, a threaded stem on the block between the two tongues, and a nut for the stem, the member carrying the blade being provided with a recess beveled at opposite sides for housing the block with the bevel tongue and bevel end of the block engaging the bevel walls of the recess and the screw stem extending through the bevel recess.

10. A protractor comprising two associated relatively rotatable members having a common axis, a work-engaging blade carried by one of the members, another work-engaging blade for the other member, and means for connecting the second work-engaging blade to the corresponding member including motion-changing devices carried by said member and connected to the blade, the motion-changing devices having an axis of movement eccentric to the common axis of said members.

11. A protractor comprising two associated relatively rotatable members having a common axis, a blade or straight edge on each member, a lever mounted on one member eccentric to the common axis and carrying one of the blades, and micrometer means on the member carrying the lever for causing micrometric movements of the blade with respect to the member carrying it.

12. A precision instrument provided with two associated relatively movable members having both coarse and fine movements of adjustment, the fine movement of adjustment comprising a movable element, a wedge block engaging said movable element to propel it, and screw actuating means for the wedge block for imparting lengthwise movements to the latter, whereby rotary movements of the screw actuating means cause lengthwise movements of the wedge block and the latter movements cause actuating movements of the movable element, each in diminishing extent with relation to the preceding part.

13. A precision instrument having coarse and fine adjustments, the fine adjustment comprising a movable element, a longitudinally movable wedge block with an inclined surface engaging the movable element and the extent of inclination representing a larger unit of adjustment of the instrument, and the wedge block having division marks thereon each representing a smaller unit of movement than the first-named unit, and actuating means for the wedge block having divisions representing still smaller units of adjustment of the instrument.

14. A precision instrument having coarse and fine adjustments, with the coarse adjustment by larger units of movement and the fine adjustment comprising a lever having its shorter arm carrying a working engaging element of the instrument, a longitudinally movable wedge block engaging the longer arm of the lever to rock said lever with the engaging surface of the block inclined with relation to the line of movement of the wedge block by an extent representing one of the longer units of adjustment and the wedge block being provided with a scale representing divisions of one of the larger units and the extent of movement of the block causing a movement of the lever to in turn move the work engaging element a distance equal to one of the larger divisions, and screw manipulating means for the block having a range of movement by one turn of the screw to actuate the block to an extent representing a still smaller fractional movement of the work engaging member.

15. A precision instrument having means for the coarse and fine adjustments of its work engaging parts with the fine adjustment comprising a lever having a short arm carrying a work-engaging member of the instrument and its long arm provided with a knife edge at one side near one end, a longitudinally movable wedge block located at one side and lengthwise of the lever and provided with a wedge surface engaging the knife edge, and a screw tapped into the wedge block for actuating the latter, said screw being provided with a manipulating head whereby the wedge block is moved longitudinally by turning the head of the screw and the lever is rocked by the wedge block engaging the knife edge.

16. A precision instrument having means for the coarse and fine adjustments of its work engaging parts with the fine adjustment comprising a lever having a short arm carrying a work-engaging member of the instrument and its long arm provided with a knife edge at one side near one end, a longitudinally movable wedge block located at one side and lengthwise of the lever and provided with a wedge surface engaging the knife edge, and a screw tapped into the wedge block for actuating the latter, said screw being provided with a manipulating head whereby the wedge block is moved longitudinally by turning the head of the screw and the lever is rocked by the wedge block engaging the knife edge, the relatively movable members of the wedge block having coacting means for holding them in different positions of relative adjustment, said wedge block being provided with markings representing larger units of angular movement of the lever, the wedge block also having markings representing fractional angular movements smaller than the units of angular movements, and the head of the manipulating screw having markings thereon representing still smaller fractional parts of angular movement of the instrument members.

17. A precision instrument having coarse and fine adjustments, the fine adjustment comprising a movable element having a spring engaging one side thereof to urge it in the opposite direction, a longitudinally movable wedge block engaging the other side of the movable element with the extent of inclination representing a larger unit of adjustment of the instrument and the wedge block having division marks thereon each representing a smaller unit of movement than the first-named unit, and actuating means for the wedge block having divisions representing still smaller units of adjustment of the instrument.

18. A precision instrument having coarse and fine adjustments, with the fine adjustment comprising a longitudinally movable wedge block having an inclined surface with the extent of inclination representing a larger unit of adjustment of the instrument and said wedge block having division marks thereon each representing a smaller unit of movement than the first-named unit, means for moving the wedge block in the direction of the length of the inclined surface, and elastically yieldable means through which the movements are transmitted to the work-engaging member of the instrument.

19. A protractor provided with two associated relatively rotatable members, a work-engaging blade for each member, means for the relative adjustment of the two associated members and the indication of such movements by degrees of the arc, and a fine adjustment for one of the work-engaging blades by minutes and seconds comprising a rock lever carrying said blade, a longitudinally movable wedge block engaging the lever with the portion of the wedge block engaging the lever having a slope corresponding to a degree of movement of the rotatable parts, with intermediate divisions representing minutes of angular movement of the lever, and a screw actuating device for the wedge block having a rotatable head, each turn of the screw representing a minute of movement of the wedge block and said head having divisions representing seconds of angular adjustment of the protractor.

20. A protractor provided with two associated relatively rotatable members, a work-engaging blade for each member, means for the relative adjustment of the two associated members and the indication of such movements by degrees of the arc, and a fine adjustment for one of the work-engaging blades by minutes and seconds comprising a rock lever carrying said blade, a longitudinally movable wedge block engaging the lever with the portion of the wedge block engaging the lever having a slope corresponding to a degree of movement of the rotatable parts, with intermediate divisions representing minutes of angular movement of the lever, and a screw actuating device for the wedge block having a rotatable head, each turn of the screw representing a minute of movement of the wedge block and said head having divisions representing seconds of angular adjustment of the protractor, said protractor having one of the two associated members provided with teeth spaced a degree apart and the other member having a pawl for engaging the teeth, whereby the coarser adjustment of the protractor is by degrees of the arc and the finer adjustment is independent of the coarser adjustment and is by minutes and seconds of the arc.

21. A protractor comprising two associated relatively rotatable members and two blades each mounted on a respective member for the movement of the blades about a common axis, one blade having an offset at one end for attachment to the respective member at a greater distance from the axis of rotation than the attachment of the other blade of the other member.

22. A protractor comprising two circular members concentrically joined for relative rotary movements, and blades each carried by a respective member exterior to the margins thereof, the connection between one blade and the respective member being provided with adjusting means for rocking the blade on an axis adjacent to the margin of the circular member carrying it.

In testimony that I claim the foregoing as my own, I have hereto affixed my signature.

DMITRY V. ZHUKOFF.